United States Patent [19]

Wucik, Jr. et al.

[11] 3,986,699

[45] Oct. 19, 1976

[54] POSITIVE SHUT-OFF SEAL

[75] Inventors: Joseph A. Wucik, Jr., Westerly, R.I.; John E. Burdick, Stonington, Conn.; James P. Azzinaro, Westerly, R.I.

[73] Assignee: Posi-Seal International, Inc., North Stonington, Conn.

[22] Filed: May 20, 1975

[21] Appl. No.: 579,218

Related U.S. Application Data

[63] Continuation-in-part of Ser. No. 485,087, July 2, 1974, abandoned.

[52] U.S. Cl. .............................. 251/173; 251/307; 251/210
[51] Int. Cl.² ......................................... F16K 1/22
[58] Field of Search ............... 137/516.29; 251/171, 251/172, 173, 305, 306, 307, 210

[56] References Cited
UNITED STATES PATENTS

| | | | |
|---|---|---|---|
| 2,913,218 | 11/1959 | Broz | 251/307 X |
| 3,156,445 | 11/1964 | Swain | 251/307 X |
| 3,282,558 | 11/1966 | Swain | 251/173 X |
| 3,556,476 | 1/1971 | Haeuky | 251/171 X |
| 3,591,133 | 7/1971 | Miles | 251/210 X |
| 3,642,248 | 2/1972 | Benware | 251/172 |
| 3,650,508 | 3/1972 | Koswala | 251/173 X |
| 3,834,663 | 9/1974 | Donnelly | 251/173 |

*Primary Examiner*—Harold W. Weakley
*Attorney, Agent, or Firm*—Kenyon & Kenyon Reilly Carr & Chapin

[57] ABSTRACT

A positive shut-off seal mechanism for use in pressurized fluid systems subject to high temperatures or fire risk. The seal mechanism includes a metallic valve seat in the form of an annular thin-walled skirt-like lip, preferably formed in a valve seat insert ring or retaining ring, the lip extending generally upstream toward the high pressure side of the valve. The edge of the lip engages a mating circumferential sealing surface of a valve disc, preferably at a location downstream from the plane of maximum disc diameter, with an interference fit to provide a preloaded radial sealing force between the edge of the lip and the sealing surface of the disc. The annular lip preferably forms the downstream side of an undercut groove for a resilient seal ring that provides a primary seal, the engagement of the lip edge with the sealing surface of the valve member providing a metal-to-metal backup seal in the event of damage to or destruction of the resilient seal ring. The valve disc material has preferably a coefficient of thermal expansion at least equal to that of the annular lip to maintain or increase sealing effectiveness with increasing temperature.

12 Claims, 6 Drawing Figures

POSITIVE SHUT-OFF SEAL

CROSS-REFERENCE TO RELATED APPLICATION

This is a continuation-in-part of copending application Ser. No. 485,087 filed on July 2, 1974 in the names of the same inventors and subsequently abandoned.

BACKGROUND OF THE INVENTION

1. Field of the Invention

The present invention relates to sealing mechanisms and more particularly to valve seal mechanisms having metal-to-metal contact for assuring positive shut-off under high temperature or fire-risk conditions.

2. Description of the Prior Art

In U.S. Pat. No. 3,642,248, issued to Robert E. Benware and owned by the assignee of the present invention, there is disclosed a valve sealing mechanism in the form of a shouldered wear ring confined in an undercut circumferential groove. The wear ring has a continuous central rib extending radially beyond the shouldered portion through the opening in the groove, the circumferential surface of the rib serving as a seating surface in mating contact with a complementary valve member sealing surface.

The wear ring in the Benware patent preferably is combined with an elastomeric O-type backing ring positioned between the bottom of the groove and the shouldered portion of the wear ring. The backing ring serves the dual function of urging the wear ring out of the groove into firm contact with the sealing surface and of sealing against leakage of fluid under pressure behind the wear ring.

An important application of butterfly valves of the general type described in U.S. Pat. No. 3,642,248 is in systems handling fluids at high pressure and temperature or flammable fluids that present a substantial risk of fire and resultant high temperatures. The patent recommends for such applications that the wear ring be fabricated of fully work hardened stainless steel and have a pair of outwardly flared side flanges extending one from each side of the shouldered portion in a generally radial direction opposite to the central rib (col. 10, line 30 through col. 11, line 32).

The flare of the side flanges is designed to provide a preloaded lateral sealing force against the sidewalls of the groove. The inner circumference of the wear ring seating surface is designed to provide a preloaded radial sealing force between the wear ring seating surface and the sealing surface of the valve member. By thus laterally and radially preloading the stainless steel wear ring, positive sealing is provided both at the seating surface-sealing surface interface and at the lines of contact between the side flanges and the walls of the groove, even if excessive temperatures should damage or destroy the elastomeric backing ring.

Although the stainless steel wear ring is an effective "fire-safe" seal, the metal-to-metal contact yields a leakage rate higher than that experienced with wear rings fabricated from various plastic materials. In addition, it is difficult and expensive to manufacture metal wear rings to the necessary dimensional tolerances for proper preloading.

SUMMARY OF THE INVENTION

It is an object of the present invention to provide an improved positive shut-off seal mechanism for "fire-safe" and other high temperature applications.

It is another object of the invention to provide a preloaded metal-to-metal seal arrangement in combination with a resilient non-metallic seal ring for maximum sealing effectiveness under normal conditions and continued shut-off protection in the event of damage to or destruction of the non-metallic seal ring.

Another object of the invention is to provide a metal valve seat arrangement for preloaded metal-to-metal sealing contact with a mating sealing surface of a valve member, the seat arrangement being adapted for easy and inexpensive manufacture.

It is still another object of the invention to provide a metal valve seat arrangement in the form of an annular thin-walled skirt-like lip having an inner circumference adapted to make preloaded sealing contact with a mating sealing surface of a valve member.

Yet another object of the invention is to provide a metal valve seat insert ring having an inner thin-walled skirt-like lip for making preloaded seling contact with a valve disc, the insert ring also serving as a retainer ring for a conventional resilient non-metallic sealing ring.

Another object of the invention is to provide a metal valve seat insert ring of the type described in which the thermal expansion coefficients of the disc and seat materials are such that sealing effectiveness increases with increasing temperature.

These and other objects are accomplished by the improved positive shut-off seal mechanism of the present invention for a pressurized fluid handling system of the type that includes a structure, such as a valve body, having a passageway with an inlet and outlet for fluid flow, an annular seating region circumscribing the fluid flow path at a location in the passageway between the inlet and the outlet, and a passageway closure member, such as a valve disc, having a circumferential sealing surface adapted to mate with the seating region when placed in opposed relation thereto.

The improved seal mechanism of the invention comprises an annular undercut skirt-like lip formed in the wall of the seating region, the lip having a free edge facing upstream toward the inlet of the passageway. The inner circumference of the free edge of the lip engages the mating sealing surface of the closure member with a predetermined interference fit to provide a preloaded radial sealing force between the edge of the lip and the sealing surface of the closure member. The sealing surface of the sealing member is normally an approximately spheroidal section to facilitate rotatable opening of the sealing member, and the line of engagement is preferably at a plane spaced downstream from the plane of maximum disc diameter. By arranging the lip so that its free edge faces upstream, the preloaded sealing force is augmented by fluid pressure from the inlet side of the passageway acting against the undercut side of the lip. In this way, as system pressure increases, so does the radial sealing pressure between the lip and the sealing surface of the valve member. In addition, increasing system pressure tends to move the valve disc downstream in the trunnion bearings, thereby tending to wedge it more tightly into sealing engagement with the annular lip.

In the above described arrangement, the annular lip of the improved seal mechanism forms an outer seating surface for mating engagement with a complementary sealing surface of a passageway closure member. The arrangement also may be reversed, with the annular lip forming an inner seating surface on the closure member for mating engagement with an outer sealing surface formed in the wall of the passageway. The former arrangement is preferred, however, because of the superior characteristics of metal subjected to tension stresses in comparison with the characteristics of metal subjected to compression stresses.

A preferred embodiment of the present invention, for use particularly in fluid systems where normal operating temperatures permit the use of resilient nonmetallic seals, incorporates the annular lip metal-to-metal seal of the present invention as the downstream mouth of an undercut groove for holding a conventional resilient sealing ring, such as a wear ring (with or without a backing ring) of the type described in the abovementioned Benware U.S. Pat. No. 3,642,248. The resilient sealing ring serves as a primary seal for minimum leakage under normal operating conditions. The metal lip serves as a backup seal for maintaining continued shut-off if damage to or destruction of the resilient seal ring occurs.

In a particularly preferred embodiment, the annular lip is formed in a separate valve seat insert ring, which may also serve as a retainer ring for a conventional resilient sealing ring or wear ring. The annular lip may be easily and inexpensively machined in the insert ring, which then may be mounted in the seating region by machine screws or other conventional fastening means. The use of a separate insert ring for the improved sealing mechanism of the present invention allows the positive shut-off feature to be selectively incorporated in standard valve bodies, as desired. Separate insert rings also may be fabricated of metals and be subjected to processes that are particularly suited to the metal-to-metal preloaded sealing function, which may result in characteristics unsuitable for the material of the valve body or other structure into which the seal mechanism is incorporated. In particular, the coefficient of thermal expansion of the insert ring material may be selected to be less than the thermal expansion coefficient for the disc, thereby producing greater seating force and increased sealing effectiveness as the temperature increases.

The foregoing and other objects, features and advantages will become more apparent from the following detailed description of the preferred embodiments and the accompanying drawings.

DESCRIPTION OF THE PREFERRED EMBODIMENT

Figure 1:
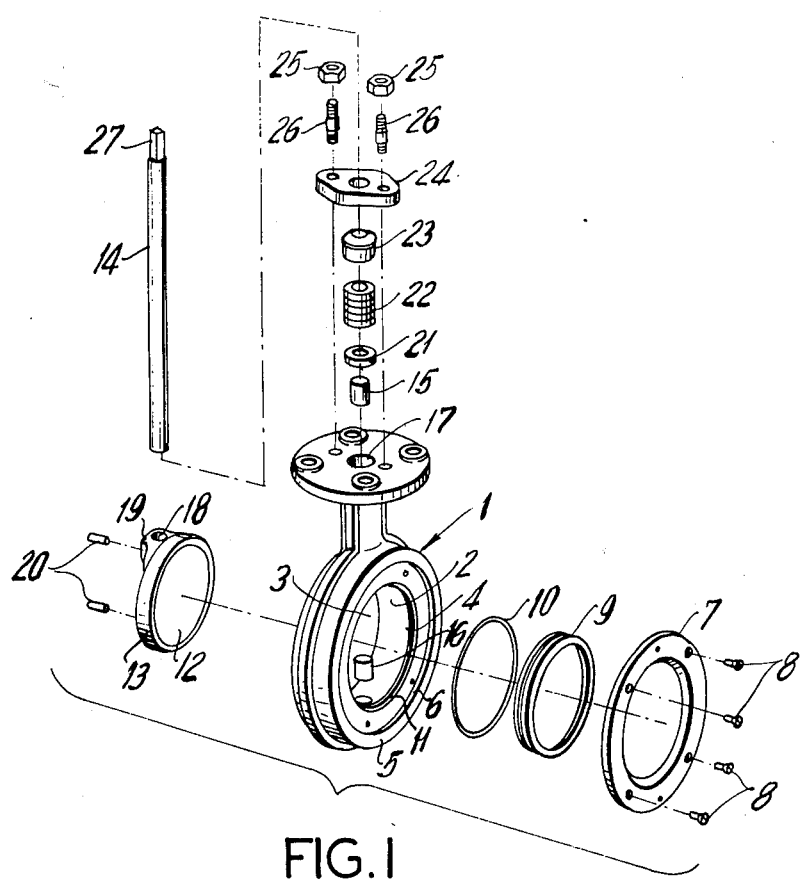
FIG. 1 is an exploded perspective view of a conventional trunnion valve suitable for incorporating the preferred embodiment of the improved seal mechanism of the present invention.

To aid in understanding the arrangement and operating principle of the improved positive shut-off seal of the present invention, it will be described in an embodiment as incorporated in an otherwise conventional butterfly valve or trunnion valve. FIG. 1 shows such a valve in exploded perspective.

The trunnion valve in FIG. 1 includes a valve body 1 in the form of a flat annular wafer having an internal passageway 2 with an inlet 3 and an outlet 4. The downstream or outlet face 5 of the valve body is counterbored with an annular recess 6 for flush mounting a retainer ring 7 by means of flat head machine screws 8. Retainer ring 7 serves to hold a sealing ring or wear ring 9 and a backing ring 10 within a circumferential groove 11 machined in the downstream edge of passageway 2. As will be described below, retainer ring 7 also incorporates the seating arrangement of the improved positive shut-off seal of the present invention.

A valve disc 12 having a circumferential sealing surface 13 is adapted to be mounted within passageway 2 for rotation about a diametral axis between an open position in which the valve disc is substantially parallel to the axis of passageway 2 and a shut position in which the valve disc is substantially perpendicular to the passageway axis and sealing surface 13 makes mating contact with the valve seat structure that includes wear ring 9 and retainer ring 7.

Means for pivotally mounting the valve disc in the passageway for rotation between the open and shut positions includes a valve stem 14 mounted in upper and lower bushings 15 and 16 for rotation within a blind hole 17 bored diametrally through the valve body. Valve stem 14 passes through a hole 18 drilled through a diametral boss 19 on the upstream face of the valve disc, which is locked to the stem by pins 20.

Leakage past the upper end of valve stem 14 is prevented by conventional stem packing means including spacer 21 and resilient packing rings 22, which are compressed in hole 17 against the top of bushing 15 by forcing gland 23 and follower 24 downward by means of nuts 25 screwed down on studs 26. Valve stem 14 is rotated in its bushings by a handle or motor drive (not shown) attached to the squared upper end 27 of the stem.

The structure and operation of the improved positive shut-off seal of the present invention is shown in detail in FIGS. 2 – 6.

Figure 2:
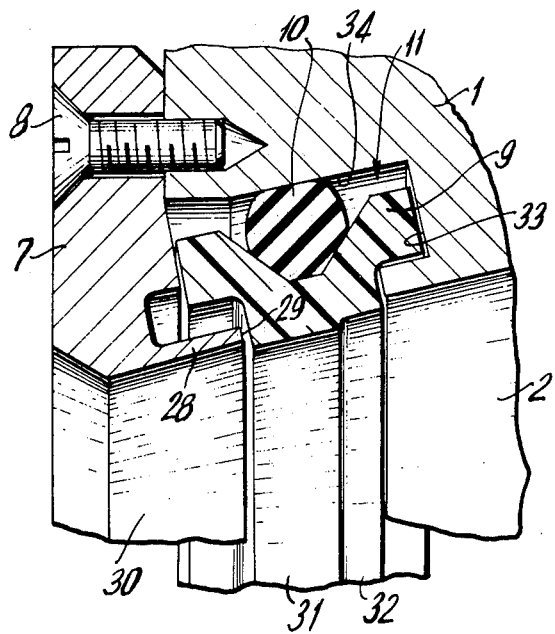
FIG. 2 is a partial cross section of the preferred embodiment of the seal mechanism in combination with a conventional wear ring and backing ring in the valve of FIG. 1 with the valve disc open.

Referring to FIG. 2, a section of the assembled seating arrangement of the valve in FIG. 1 is shown. The form of shouldered sealing ring 9 and backing ring 10 and their arrangement within groove 11 are substantially as described in the previously mentioned Benware U.S. Pat. No. 3,642,248.

The improvement of the present invention is characterized by an annular undercut skirt-like lip 28 machined in retainer ring 7 and forming the downstream mouth of groove 11. Lip 28 extends generally upstream and has a free edge 29 that faces upstream toward the inlet of passageway 2. The inner surface 30 of lip 28 has a smaller diameter at the free edge of the lip than the diameter of passageway 2, the diameter of surface 30 being approximately the same as the diameter of seating surface 31 of sealing ring 9.

The diameters of both inner surface 30 of lip 28 and seating surface 31 of sealing ring 9 also are smaller than the diameter of sealing surface 13 of valve disc 12. Thus, when the valve disc is shut, as shown in FIG. 2, seating surfaces 30 and 31 of lip 28 and sealing ring 9, respectively, each engage sealing surface 13 of valve disc 12 with an interference fit to provide a preloaded radial sealing force between the respective seating surfaces and the sealing surface of the disc.

For maximum sealing effectiveness and minimum operating torque, sealing ring 9 is preferably made of a resilient plastic material, such as tetrafluoroethylene (TFE). Since such material has a relatively low modulus of elasticity, the sealing force obtainable from the interference fit between the ring and the disc is also relatively low. By use of an elastomeric backing ring 10 of suitable size, additional sealing force is produced through squeezing of the backing ring, as shown in FIG. 2. The radial sealing pressure resulting from a given sealing force acting on the sealing ring also can be increased by relieving an annular portion 32 of sealing ring 9 to reduce the area of contact between the ring and the disc.

Figure 4:
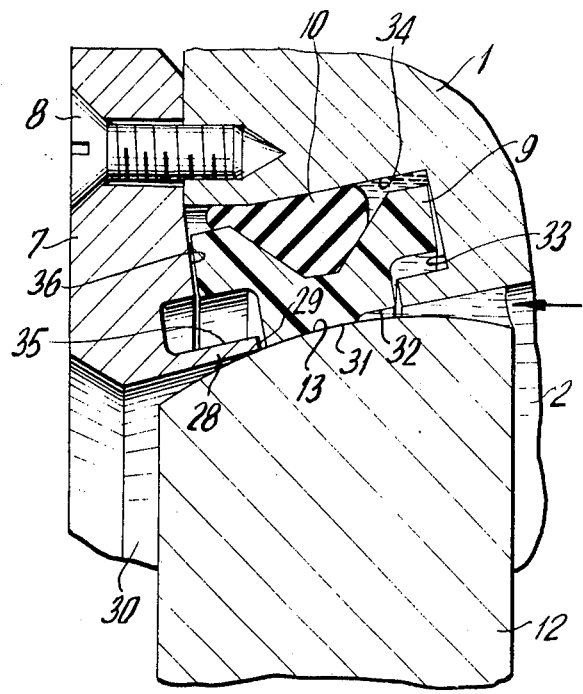
FIG. 4 is a partial section view similar to FIG. 3 but with fluid under pressure introduced on the inlet side of the valve.
Figure 5:
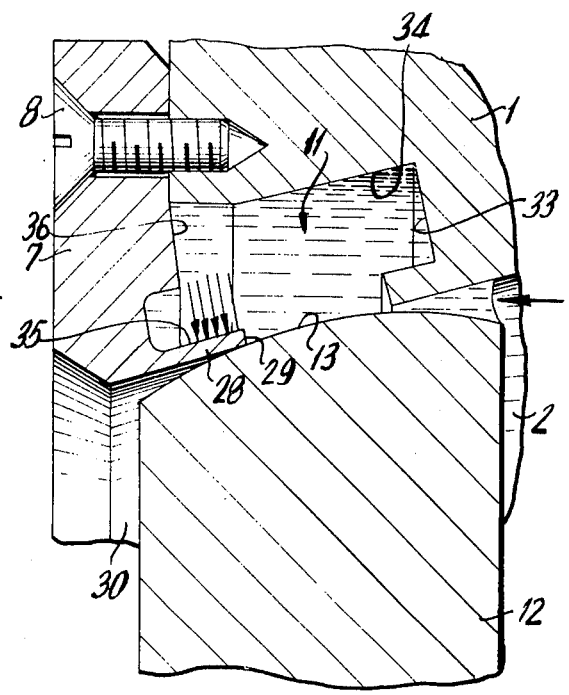
FIG. 5 is a partial section view similar to FIG. 4 illustrating the self-acting sealing function of the mechanism of the present invention in the event that the wear ring has been destroyed or is otherwise missing.

FIGS. 4 and 5 illustrate the effect of introducing fluid under pressure into the inlet side of the valve. In FIG. 4, fluid under pressure, as indicated by the arrow, tends to displace the upstream skirt of sealing ring 9 away from upstream sidewall 33 of the groove. The pressurized fluid then passes into the region between the sealing ring and bottom 34 of the groove, where it urges the elastomeric backing ring into the downstream corner of the groove. The result is to increase the sealing effectiveness of the prior art sealing ring and backing ring combination, as described in the previously mentioned U.S. Pat. No. 3,642,248. As long as the sealing and backing rings are intact and fully operative, the preloaded metal lip 28 of the present invention carries little or no sealing responsibility.

If, however, sealing ring 9 and backing ring 10 are damaged or destroyed, as by fire, the situation illustrated in FIG. 5 results. In that case, fluid under pressure fills groove 11, and the only contact between the valve seat and the disc is between the inner surface of the free edge of lip 28 and sealing surface 13 of the valve disc.

The reasons for undercutting the lip to form a thin-walled skirt-like ring become apparent from consideration of FIG. 5. Lip 28 acts as a spring member that can be designed with a substantial radial interference fit with the valve disc without causing excessive binding in the operation of the valve. A nominal radial interference of at least 0.005 inch is necessary for even the smaller valve sizes to assure a preloaded sealing fit for all valve and seat combinations under normal manufacturing tolerances. In addition, the outer surface 35 of lip 28 provides an area against which the system pressure (as indicated by the arrows) can act to provide additional sealing force. Thus, the design of the lip results in a self-acting type of seal that increases in sealing effectiveness with increasing system pressure.

The sealing effectiveness of the lip also can increase with increasing temperature if the coefficient of thermal expansion for the lip material is less than the coefficient of thermal expansion for the disc. For example, if the disc is stainless steel and the ring is carbon steel, the disc circumference will expand faster than the lip circumference with increasing temperature, thereby causing the disc to seat more tightly on the lip ring. Other materials with correspondingly differing thermal coefficients can also be chosen, depending on the valve operating conditions.

Figure 3:
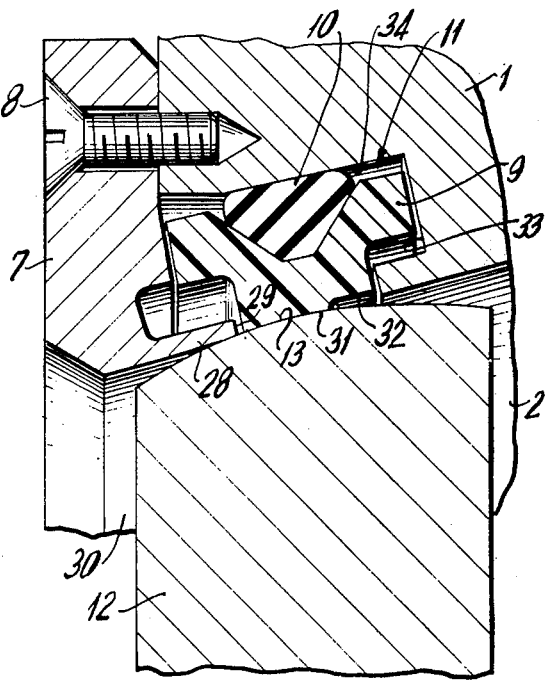
FIG. 3 is a partial section view similar to FIG. 2 but with the valve disc closed.
Figure 6:
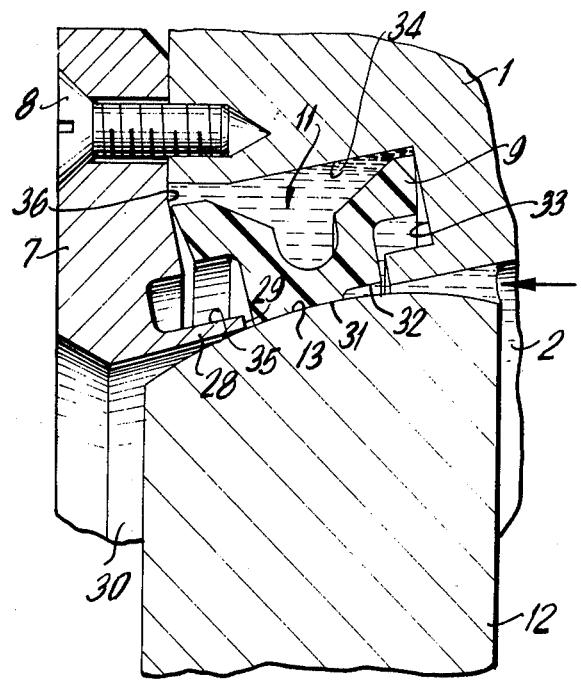
FIG. 6 is a partial section view similar to the embodiment of FIG. 5 but without a backing ring for the wear ring.

The combination of a prior art sealing ring and backing ring with the positive shut-off metal-to-metal seal of the present invention, as illustrated in FIGS. 2 – 4, is the preferred arrangement for maximum sealing effectiveness in most cases. FIG. 6 illustrates an alternative arrangement in which the seal of the present invention is used in combination with a sealing ring alone. This arrangement is indicated when operating conditions are adverse to the elastomeric material (usually natural or synthetic rubber) of the backing ring. The sealing ring, as before, may be made of resilient plastic, such as TFE, or in extreme cases it could be made of metal, if a double metal-to-metal seal in necessary.

As shown in FIG. 6, the sealing ring alone is effective under normal conditions to seal both at the interface between seating surface 31 and sealing surface 13 and behind the sealing ring at the interface between downstream sidewall 36 of the groove and the contiguous flange of sealing ring 9 by reason of fluid pressure behind the sealing ring acting radially inward and laterally outward against the back surfaces of the seating portion and side flanges, respectively, of the ring.

Although the preferred arrangement of the undercut annular skirt-like seal mechanism of the present invention is in combination with the sealing and backing ring design of U.S. Pat. No. 3,642,248, the seal mechanism can be used with other conventional resilient sealing members or by itself, if desired. In designs in which the undercut skirt-like seal is intended to be used alone, it is not necessary to machine an upstream groove for a resilient sealing ring, but in a standard line of valves, for example, a groove arrangement as in FIG. 5 permits a wide variety of seal combinations, depending on the operating conditions intended for the valve.

The preferred arrangement for the seal mechanism of the present invention also has been shown as part of a retainer ring or insert ring. The undercut skirt-like lip of the invention can be machined directly in the passageway wall of a valve body, but a separate insert ring provides several advantages. Some of these advantages, such as ease of machining and use of particularly suitable valve seat materials, have been described above.

In addition, the retaining ring design of the illustrated embodiment permits easy insertion of the sealing ring and or backing ring and also provides a degree of self centering action to accommodate some amount of mis-centering of the valve disc in the valve body. This self centering action is obtained by shutting the valve disc before the mounting screws of the retaining ring are torqued down tight. The play of the screw holes will allow the ring to shift slightly to adapt itself to the valve disc, and then the screws may be tightened.

It has been mentioned previously that the undercut skirt-like lip acts like a spring member. It is important in designing a seal for a particular application, therefore, to ensure that the yield point of the metal not be exceeded. From the basic stress-strain relation for elastic materials and the geometric configuration of the annular lip, the equation for determining the maximum permissible radial interference for a given valve size can easily be derived.

$$\Delta r = \frac{1}{2} S/E \cdot d,$$

where $\Delta r$ = max. permissible radial interference, inches.

S = max. allowable hoop tensile stress in lip, psi
E = Young's modulus for lip material, psi
d = average diameter of lip, inches It has been determined experimentally that radial interferences of from about 0.005 inch to about 0.010 inch give satisfactory results for valve sizes ranging from 1½ inch to 36 inch nominal diameters. For sizes above 36 inches it is expected that the radial interference should be increased to from about 0.008 inch to about 0.015 inch. The foregoing figures are intended to be exemplary rather than limiting, however, and it should be noted that they refer to dimensions as measured after the valve disc and seat have been "lapped in" by several cycles of opening and closing. Even with ground mating surfaces it has been found that measured inside diameter of the undercut lip will increase by 0.015 inch to more than 0.020 inch over ten initial operating cycles of a valve; so that a designed preload could be lost if this initial wear-in is not taken into account.

In addition to limiting the radial interference so as to remain within the elastic limit of the sealing lip material, it is also important to limit the cross-sectional area of the lip (width times thickness) to keep the hoop tension force in the lip below a value that relates to the maximum desirable operating torque for the valve. The relation between hoop tension force and operating torque can be determined experimentally, and the corresponding cross-sectional area, A, is given by the equation, $$A = \frac{F \cdot d}{2E \cdot \Delta r},$$

where
F = maximum permissible hoop tension force, lbs.
d = average diameter of lip, inches
E = Young's modulus, psi
Δr = radial interference, inches To illustrate to those skilled in the art a practical adaptation of the present invention to a range of valve sizes, the following table gives representative lip dimensions for three trunnion valve sizes, all dimensions being in inches:

| Valve Size | Lip Width | Lip Thickness |
|---|---|---|
| 6 | 0.135 | 0.020 |
| 10 | 0.140 | 0.025 |
| 20 | 0.180 | 0.025 |

In each of the above examples the width of the undercut lip is at least 5 times the thickness of the lip and less than 10 times the thickness of the lip. Although the range of operability of the present seal design is not limited to between these ratios, they represent preferred practical limits. Below a width to thickness ratio of about 5 the valve operating torque tends to be higher than desirable, and there is too little surface exposed to system pressure to produce significant self acting effect. Above a ratio of about 10, the lip becomes difficult to machine, and the maximum sealing preload force obtainable without exceeding the elastic limit of the material falls below optimum values.

The preferred embodiment of the improved positive shut-off sealing mechanism of the present invention having thus been illustrated and described, it will be appreciated that the scope of the invention is not necessarily limited thereby and that other arrangements and embodiments can be perceived by those skilled in the art as falling within the inventive teaching of the foregoing disclosure.

For example, the preferred embodiment has been illustrated with the undercut annular lip as forming an external seating member for mating with a circumferential sealing surface on a valve disc. The positions of the sealing surface and annular lip can be reversed, however, so that the lip is carried by the valve disc, or similar internal passageway closing member, and the sealing surface forms the valve seat.

In such an arrangement, the annular lip would be preloaded in compression. Since the tensile properties of metals are normally substantially superior to their compressive properties, the arrangement having a metal lip surrounding the sealing surface is preferred. Other lip materials having superior compression properties, such as possibly ceramics, could be more suited to the inverse arrangement.

We claim:
1. An improved positive shut-off seal mechanism for a valve of the type that includes a valve body having an inlet opening, an outlet opening and a connecting passageway for providing a flow path for fluid from the inlet to the outlet, a first annular surface defined in the wall of the passageway circumscribing the fluid flow path at a location between the inlet and the outlet, a valve disc having a second annular surface difined on its circumference, one of said first and second annular surfaces forming a seating region and the other annular surface forming a sealing surface, and means for pivotally mounting the valve disc in the passageway for selective rotation of the second annular surface into and out of opposed mating relation with the first annular surface, the improved seal mechanism comprising:
   a valve seat insert ring attached to the seating region, said insert ring having a thin-walled skirt-like lip, with the edge of the lip facing upstream toward the inlet of the passageway and engaging the sealing surface with a predetermined interference fit to provide a preloaded radial sealing force between the edge of the lip and the sealing surface when the second annular surface is rotated into opposed mating relation with the first annular surface;
   a groove formed in the seating region upstream of the insert ring, the edge of the lip of the insert ring serving as the downstream mouth of the groove; and
   a resilient seal ring disposed in the groove and having a circumferential seating surface protruding through the mouth of the groove for sealingly engaging the sealing surface when the valve disc is rotated so that the second annular surface is in opposed mating relation with the first annular surface.

2. The seal mechanism of claim 1 wherein the material of the disc has a coefficient of thermal expansion that is at least equal to the coefficient of thermal expansion of the insert ring.

3. An improved positive shut-off seal mechanism for a pressurized fluid system of the type that includes a structure having a passageway with an inlet and an outlet for fluid flow, a valve seat in the passageway circumscribing the fluid flow path at a location between the inlet and outlet, a valve member having a circumferential sealing surface, and means for mounting the valve member in the passageway for selectively engaging and disengaging the sealing surface of the valve member with the valve seat for respectively preventing and permitting fluid flow therethrough, the improved seal mechanism comprising:
- a circumferential groove formed in the wall of the passageway at the location of the valve seat, the groove having an upstream sidewall toward the inlet of the passageway and a downstream sidewall toward the outlet of the passageway;
- a resilient seal ring disposed in the groove and having an inner circumferential seating surface protruding through the mouth of the groove for sealingly engaging the sealing surface of the valve member to form a primary seal therewith; and
- an undercut skirt-like lip formed in the downstream sidewall at the mouth of the groove, the lip extending from the downstream sidewall toward the upstream sidewall, and the inner circumference of the edge of the lip engaging the sealing surface of the valve member with a predetermined interference fit to provide a secondary seal therewith, whereby said secondary seal prevents fluid flow between the inlet and the outlet of the passageway in the event of damage to or destruction of the resilient seal ring.

4. The seal mechanism of claim 3 wherein the resilient seal ring is composed of nonmetallic material.

5. The seal mechanism of claim 3 wherein the resilient seal ring is composed of plastic material.

6. The seal mechanism of claim 3 wherein the material of the disc has a coefficient of thermal expansion that is at least equal to the coefficient of thermal expansion of the insert ring.

7. An improved positive shut-off valve for a fluid system of the type that includes a valve body having a passageway with an inlet and an outlet for fluid flow, an annular seating region defined by an interior surface of the passageway circumscribing the fluid flow path at a location between the inlet and the outlet, and a passageway closure member having a circumferential sealing surface of decreasing circumference in the downstream direction adapted to mate with the seating region when placed in opposed relation thereto to prevent fluid flow between the inlet and the outlet, the improved valve comprising:
- an annular undercut skirt-like lip formed in the wall of the passageway in the seating region, the lip having a free edge facing upstream toward the inlet of the passageway, the inner circumference of the free edge of the lip engaging the mating sealing surface of the closure member at a plane displaced downstream from the plane of maximum closure member circumference with a predetermined interference fit to provide a preloaded radial sealing force between the edge of the lip and the sealing surface of the closure member, whereby positive differential fluid pressure between the inlet and the outlet of the passageway acting against the undercut side of the lip serves to increase the radial sealing force between the edge of the lip and the sealing surface of the closure member, and increasing said differential pressure serves to wedge the closure member more tightly into sealing engagement with the free edge of the lip;
- a circumferential groove formed in the passageway upstream of the skirt-like lip, the edge of the lip serving as the downstream mouth of the groove, and the groove having a second undercut lip forming the upstream mouth thereof;
- a resilient seal ring disposed in the groove and having a circumferential seating surface protruding through the lips of the groove for sealingly engaging the sealing surface of the closure member when the sealing surface of said member is in opposed mating relation with the free edge of the lip,
- the seal ring having shoulders on either side of the protruding seating surface wider than the space between the downstream and upstream lips.

8. The valve of claim 7 wherein the undercut lip is rectangular in cross section, the width of the lip being substantially greater than the thickness of the lip.

9. The valve of claim 7 wherein the width of the undercut lip is at lest approximately 5 times its thickness.

10. The valve of claim 7 wherein the width of the undercut lip is between approximately 5 and 10 times the thickness of the lip.

11. The valve of claim 7 wherein the radial interference between the edge of the lip and the mating sealing surface of the closure member is at least approximately 0.005 inch.

12. The valve of claim 7 wherein the radial interference between the edge of the lip and the mating sealing surface of the closure member is between about 0.005 inch and about 0.015 inch.

* * * * *